United States Patent
Sathe et al.

(10) Patent No.: US 8,836,403 B2
(45) Date of Patent: Sep. 16, 2014

(54) PROGRAMMABLE CLOCK DRIVER

(75) Inventors: Visvesh S. Sathe, Fort Collins, CO (US); Srikanth Arekapudi, Sunnyvale, CA (US); Samuel D. Naffziger, Fort Collins, CO (US); Manivannan Bhoopathy, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/601,175

(22) Filed: Aug. 31, 2012

(65) Prior Publication Data

US 2014/0062564 A1 Mar. 6, 2014

(51) Int. Cl.
*G06F 1/04* (2006.01)
*H03K 3/00* (2006.01)

(52) U.S. Cl.
USPC .............. 327/291; 327/294; 327/299; 326/93

(58) Field of Classification Search
USPC .............................. 327/291, 294, 299; 326/93
See application file for complete search history.

(56) References Cited

U.S. PATENT DOCUMENTS

| | | | |
|---|---|---|---|
| 6,025,738 A | 2/2000 | Masleid | |
| 6,088,250 A | 7/2000 | Siri | |
| 6,205,571 B1 | 3/2001 | Camporese et al. | |
| 6,310,499 B1 | 10/2001 | Radjassamy | |
| 7,082,580 B2 | 7/2006 | Zarkesh-Ha et al. | |
| 7,084,685 B2 * | 8/2006 | Lin et al. | 327/291 |
| 7,237,217 B2 | 6/2007 | Restle | |
| 7,702,944 B2 | 4/2010 | Chelstrom et al. | |
| 8,339,209 B2 | 12/2012 | Papaefthymiou et al. | |
| 8,362,811 B2 | 1/2013 | Papaefthymiou et al. | |
| 8,368,450 B2 | 2/2013 | Papaefthymiou et al. | |
| 8,400,192 B2 | 3/2013 | Papaefthymiou et al. | |
| 8,502,569 B2 | 8/2013 | Papaefthymiou et al. | |
| 2005/0057286 A1 | 3/2005 | Shepard et al. | |
| 2008/0303576 A1 | 12/2008 | Chueh et al. | |
| 2009/0027085 A1 | 1/2009 | Ishii et al. | |
| 2011/0084736 A1 | 4/2011 | Papaefthymiou et al. | |
| 2011/0084772 A1 | 4/2011 | Papaefthymiou et al. | |
| 2011/0084773 A1 | 4/2011 | Papaefthymiou et al. | |
| 2011/0084774 A1 | 4/2011 | Papaefthymiou et al. | |
| 2011/0084775 A1 | 4/2011 | Papaefthymiou et al. | |
| 2011/0090018 A1 | 4/2011 | Papaefthymiou et al. | |
| 2011/0090019 A1 | 4/2011 | Papaefthymiou et al. | |

(Continued)

FOREIGN PATENT DOCUMENTS

WO 95/19659 A1 7/1995

OTHER PUBLICATIONS

U.S. Appl. No. 13/601,188, filed Aug. 31, 2012, entitled "Clock Driver for Frequency Scalable Systems," naming inventors Visvesh S. Sathe et al.

(Continued)

*Primary Examiner* — John Poos
(74) *Attorney, Agent, or Firm* — Abel Law Group, LLP

(57) ABSTRACT

A clock driver circuit supplies a clock signal with a drive strength determined according to one or more control signals supplied to the clock driver that vary during run-time. The clock driver is operated with a first drive strength in a non-resonant mode of operation of an associated clock network and with a second drive strength in a resonant mode of operation of the associated clock network, the first drive strength being higher than the second drive strength.

18 Claims, 7 Drawing Sheets

(56) References Cited

U.S. PATENT DOCUMENTS

| | | |
|---|---|---|
| 2011/0140753 A1 | 6/2011 | Papaefthymiou et al. |
| 2012/0306585 A1 | 12/2012 | Mack |
| 2013/0049824 A1 | 2/2013 | Kim et al. |
| 2013/0154727 A1 | 6/2013 | Guthaus |
| 2013/0194018 A1 | 8/2013 | Papaefthymiou et al. |

OTHER PUBLICATIONS

U.S. Appl. No. 13/601,155, filed Aug. 31, 2012, entitled "Controlling Impedance of a Switch Using High Impedance Voltage Sources to Provide More Efficient Clocking," naming inventors Visvesh S. Sathe and Samuel Naffziger.

U.S. Appl. No. 13/601,119, filed Aug. 31, 2012, entitled "Constraining Clock Skew in a Resonant Clocked System," naming inventors Visvesh S. Sathe and Samuel Naffziger.

U.S. Appl. No. 13/601,138, filed Aug. 31, 2012, entitled "Transitioning from Resonant Clocking Mode to Conventional Clocking Mode," naming inventors Visvesh S. Sathe and Samuel Naffziger.

Ikeuchi, Katsuyuki et al. "Switched Resonant Clocking (SRC) Scheme Enabling Dynamic Frequency Scaling and Low-Speed Test," IEEE 2009 Custom Integrated Circuits Conference (CICC) pp. 33-36.

Non-final Office action in U.S. Appl. No. 13/601,155, dated Aug. 9, 2013, 15 pages.

Non-final Office action in U.S. Appl. No. 13/601,119, dated Nov. 13, 2013, 16 pages.

Non-final Office action in U.S. Appl. No. 13/601,138, dated May 28, 2013, 26 pages.

Non-final Office action in U.S. Appl. No. 13/601,188, dated Aug. 6, 2013, 16 pages.

Final Office action in U.S. Appl. No. 13/601,188, dated Nov. 18, 2013, 16 pages.

\* cited by examiner

PROGRAMMABLE CLOCK DRIVER

BACKGROUND

1. Technical Field

Embodiments described herein relate to clock distribution networks in integrated circuits and more particularly to programmable clock drivers.

2. Description of the Related Art

Clock distribution networks account for a significant portion of overall power consumption in most high performance digital circuits today due to the large amounts of parasitic capacitance that is connected to the clock network. The switching frequency of the clock network, along with the need for a network that is robust to process and temperature variation, adds to the power consumption of the clock network.

A generalized view of the clock grid 100 can be seen in FIG. 1. The source of the clock signal 101 is typically a phased-lock loop (PLL), which is distributed over the processor core using a single, or a combination of clock trees, before a final stage of clock drivers drive a clock mesh. The clock grid 100 is divided into portions or tiles 103, which contain a clock mesh shown inside tile 103 coupled to the final driver 105. The size of the final driver 105 is a function of the effective load that the final clock driver drives on the mesh. The clock mesh allows for a robust clock grid whose clock skew and slew are less susceptible to process and temperature variation. The number of levels and physical distribution of the clock tree, and the number of tiles that make up the clock grid in various microprocessors or other integrated circuits, will vary. Nevertheless, many implementations of the global clock network are a variation of the approach illustrated in FIG. 1.

Most of the clock load in the distribution is found in the clock grid, and the final clock driver. Due to the difficulty in comprehensively modeling the impact of inductive effects in the clock grid, the impact of process variation, and varying temperature distribution during the various tasks performed by the processor, the clock grid tends to be overdesigned and overdriven to ensure that the grid will be robust to process and temperature variation. In most cases, overdriving the clock network does not provide additional performance benefit but is nonetheless required to provide a margin of safety. In addition, while this performance margin is desired in high performance microprocessor modes, the resulting power dissipation is often not warranted when the processor is operating in energy-efficient, low performance modes.

SUMMARY OF EMBODIMENTS OF THE INVENTION

Accordingly, in an embodiment a method is provided in which a clock driver circuit supplies a clock signal with a drive strength determined according to one or more control signals supplied to the clock driver that vary during run-time. In an embodiment the clock driver is operated with a first drive strength in a non-resonant mode of operation of an associated clock network and with a second drive strength in a resonant mode of operation of the associated clock network, the first drive strength being higher than the second drive strength.

In an embodiment, the method further includes operating the clock network, which is divided into tiles, with a first common configuration for a first subset of the tiles and operating the clock network with a second common configuration for a second subset of the tiles. An embodiment includes operating the clock network, with the first subset of tiles having a drive setting for drivers in the first subset set to d where 0≤d<k, where k is a number of driver configuration modes, and operating the second subset set of tiles with a drive configuration of d+1, where a drive configuration of d+1 provides a higher drive strength than a drive configuration of d. A drive setting of "d" modulates the driver strength of each driver to d/k of its full drive strength.

In another embodiment, a clock driver circuit includes a plurality of clock driver segments coupled to receive an input clock signal and supply a segment clock signal output to an output node of the clock driver circuit, wherein a drive strength of an output clock signal on the output node of the clock driver circuit is based on a drive strength of each of the segment clock signals. One or more of clock driver segments is responsive to one or more of the control signals to vary a segment drive strength based on the one or more control signals and thereby vary the drive strength of the output clock signal.

In another embodiment, a clock driver circuit includes a plurality of blocks coupled to supply a clock signal to an output node. A plurality of sub-blocks forms each of the blocks. At least one of the sub blocks having a different drive strength than another of the sub blocks.

In another embodiment, an apparatus includes a clock driver circuit of a clock network. The clock driver circuit is coupled to receive an input clock signal and to supply an output clock signal with a drive strength determined according to one or more control signals supplied to the clock driver that vary during run-time.

In an embodiment, the clock driver circuit is operable to provide the output clock signal with a first drive strength in a non-resonant mode of operation of the clock network and with a second drive strength in a resonant mode of operation of the clock network, the first drive strength being higher than the second drive strength, the one or more control signals having a value based on whether the clock network is operating in the resonant mode or the non-resonant mode.

In another embodiment, an apparatus includes a clock network including a plurality of clock drivers, the clock network being divided into tiles, the clock network having a first common driver configuration for a first subset of tiles and a second common driver configuration for a second subset of the tiles. In an embodiment the first subset of tiles has a drive strength setting of d for drivers in the first subset, where 0≤d<k, where k is a number of driver configuration modes corresponding to different drive strength, and the second subset of tiles have a drive configuration strength setting of d+1, where a drive configuration of d+1 provides a higher drive strength than a drive configuration of d. A drive setting of "d" modulates the driver strength of each driver to d/k of its full drive strength.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Various embodiments described herein provide for a mode dependent modulation of the drive strength of the final driver that allows for a silicon-test informed trade-off between performance margin and energy efficiency depending on the processor operating mode, e.g., resonant or non-resonant mode. By utilizing clock drivers having drive strengths that can be programmed at run time, unnecessary margining at design time of the drive strength of the driver is replaced with a post-silicon and runtime based margining. Thus, significant efficiencies can be obtained. Thus, one or more embodiments provide a clock driver whose drive-strength can be configured at runtime, along with an effective configuration scheme that allows for the numerous clock drivers in the design (which can often run into the hundreds) to be configured.

In an embodiment a configuration register, accessible by the processor core, contains information allowing each final clock driver in the core to be configured to the desired drive strength based, e.g., on its load and whether the system is operating in resonant or non-resonant mode. The configuration information may be provided through various software registers, or through a fuse table, or any other approach that can be used to configure the integrated circuit part.

Figure 1:
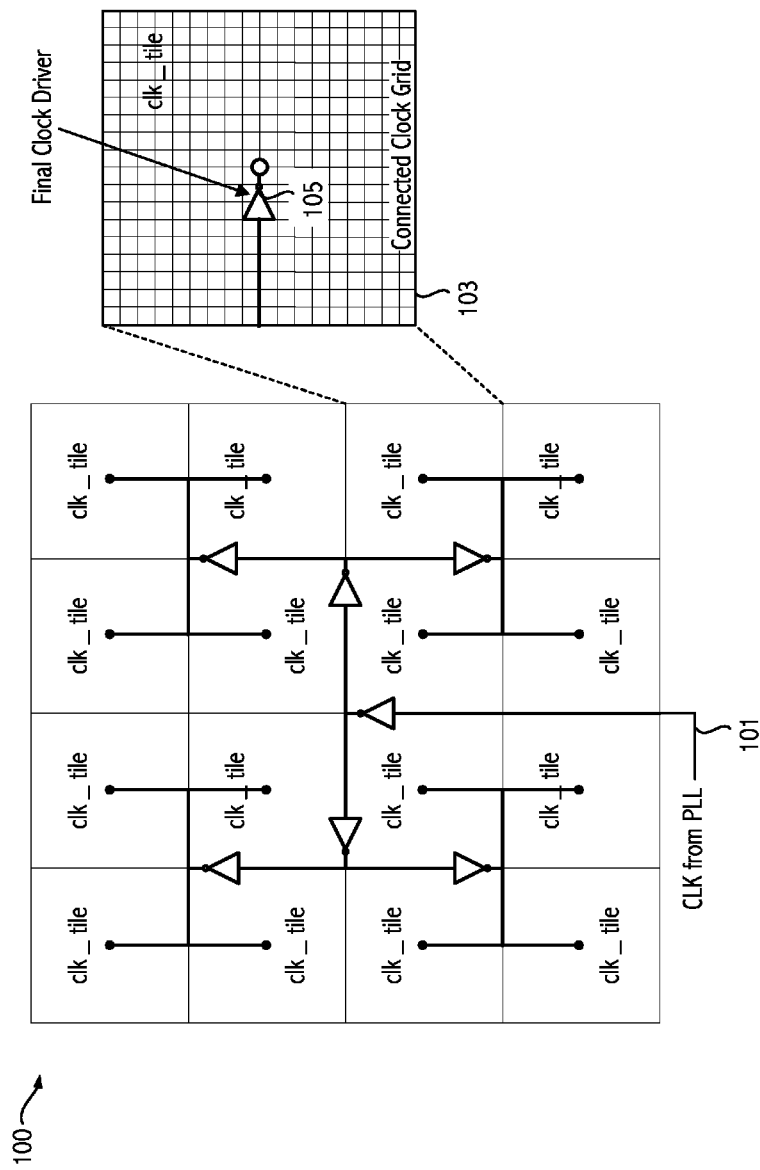
FIG. 1 illustrates a generalized view of a clock grid.
Figure 2:
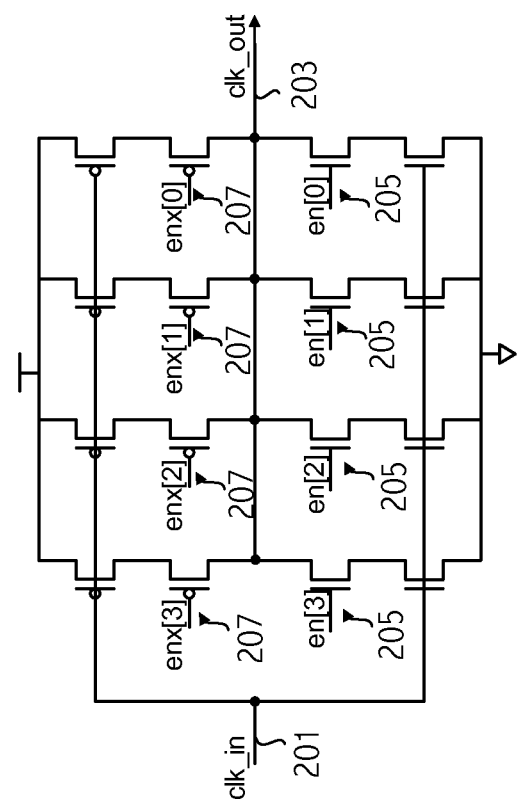
FIG. 2 illustrates an example of a configurable clock driver.

Each clock driver in the palette of final drivers may be designed so that its drive strength can be varied based on the configuration setting. FIG. 2 illustrates an example of a configurable clock driver. By applying a configuration setting (en[3:0]), the desired drive strength can be applied to each driver. A clk-in signal is received on node 201. The number of transistor pairs turned on by the enable signals en[3:0] determine the drive strength of the clk_out signal supplied on node 203. The en[3:0] signals provide the configuration settings for the NMOS devices 205 and the enx[3:0] provide the configuration settings for the PMOS devices 207. In general, a wide range of driver configurability is available.

Figure 3:
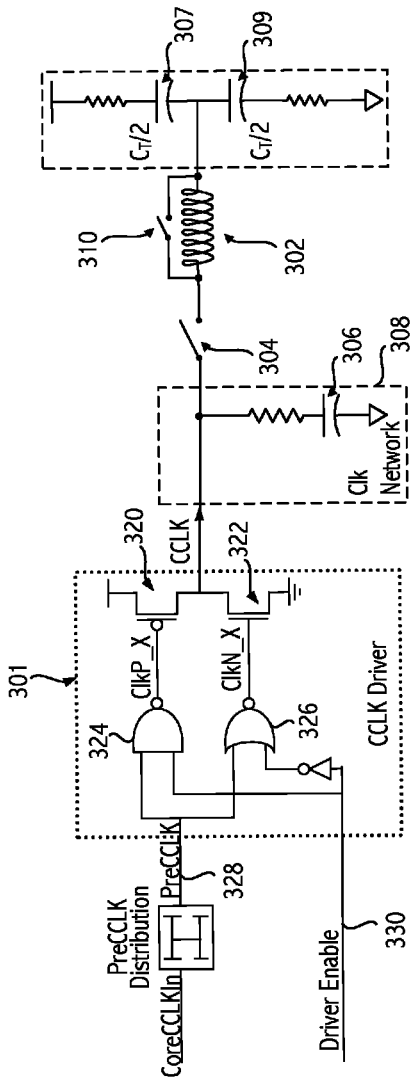
FIG. 3 illustrates a simplified model of a resonant clock network and an embodiment of a basic building block of a programmable driver used in the clock network.

As stated above, clock distribution networks account for a significant portion of overall power consumption in most high performance digital circuits today due to the parasitic capacitance that is connected to the clock network. One technique to implement a more energy-efficient clock distribution is the use of resonant clocking. In contrast with a conventional clock network, where all the charge, and therefore energy per cycle is provided by the power supply, the approach illustrated in FIG. 3 uses LC resonance between the parasitic capacitance and the applied inductance to enable efficient energy transfer between the two components. The role of the clock driver in resonant mode is to replenish only the energy lost in the parasitic resistance of the LC system. FIG. 3 illustrates a simplified model of a resonant clock system 300 having a clock network or grid (or portion thereof) 308 driven by clock driver 301. A distinct feature of the resonant clock system is the use of an inductance 302 that is connected in parallel with the parasitic network capacitance 306. For an ideal inductor and interconnect, with no parasitic resistance, the clock network would oscillate with zero energy dissipation.

Processors and other integrated circuits can operate in low power modes. In such modes it is typical for the frequency of operation to be significantly reduced below its maximum value. The reduced frequencies are typically far from the resonant frequency at which the resonant clock network would operate. Trying to operate the clock network at frequencies far from the resonant frequency would result in degradation of the clock signal due to the presence of the LC circuit. Accordingly, it can be advantageous to operate the clock network in a non-resonant mode when the frequency of operation is far from the resonant frequency. In order to accommodate both resonant and non-resonant modes of operation, one approach uses a dual clock mode of operation. At frequencies at or near the resonant frequency, the processor operates in the resonant clock mode. At frequencies outside the range where resonant clocking can be robustly operated, the processor works in a conventional non-resonant mode. One approach that provides for resonant and non-resonant modes of operation utilizes a series switch 304 along the series path between the inductor 302 and the clock grid 308, which is closed during resonant operation and open in conventional mode so as to disconnect the inductor and capacitors 307 and 309 from the grid. When the series switch 304 is closed during resonant operation, the inductor 302 and capacitors 307 and 309 are available for resonant operation. When the switch 304 is open, the inductor 302 and the capacitors 307 and 309 are operatively decoupled from the clock grid 103 such that the clock grid no longer can use the resonance of the LC circuit to help provide energy for the clocks in the clock grid. By opening the switch in non-resonant mode, the clock grid does not suffer degradation in the clock signal that would otherwise be present due to operation of the resonant network at frequencies far from the resonant frequency.

In resonant mode, due to the energy that is recovered from the LC circuit, the clock driver can drive with lower power. In non-resonant mode, the clock driver may need to drive with higher power. A dual or multi-mode driver, which has a variable driver strength capability depending on the mode of operation, allows the drive strength to be matched to the needs of the system. Thus, e.g., referring again to FIG. 2, in resonant mode the configuration signals enable fewer than all pairs of the PMOS and NMOS transistors, and in non-resonant mode, the configuration signals enable more (or all) of the pairs of PMOS and NMOS transistors to provide a clock system that effectively operates in both conventional mode and in a power saving resonant mode. By dynamically changing the configuration signals of the driver when switching between resonant and non-resonant mode during run-time, e.g., the clock system is more power efficient.

While dynamic configuration of drivers is useful for switching between resonant and non-resonant modes of operation, such dynamic configuration is useful in clocked systems generally wherever dynamically variable drive strengths can be effectively utilized. For example, in conventionally clocked systems, lower drive strengths may be associated with power saving modes of operation where lower clock frequencies are used and higher drive strengths with higher clock frequencies.

Figure 4:
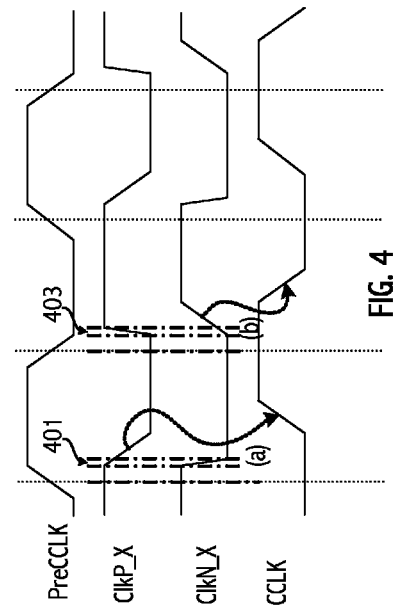
FIG. 4 illustrates a timing diagram illustrating operation of the programmable driver of FIG. 3.

FIG. 3 also illustrates an embodiment of a basic building block of a programmable driver. The ability to control PMOS transistor 320 and NMOS transistor 322 separately, helps to save power compared to a conventional inverter model, where the same control signal (with an inversion) controls both transistors in the driver. In an embodiment the NAND gate 324 and NOR gate 326 are specifically skewed to turn-off faster than they turn on to reduce the overlap as much as possible between the PMOS and NMOS ON times. FIG. 4 illustrates the overlap at 401 and 403 and the skew between turning on and turning off, thereby reducing the crowbar current, which is an important component of dynamic switching power. Thus, as shown in FIG. 4, ClkP_X, which drives PMOS transistor 320, turns on more slowly (goes low) than ClkN_X turns off (goes low). Similarly, ClkP_X, which drives PMOS transistor 320, turns off more quickly (goes high) than ClkN_X turns on (goes high). The turn-on edges of ClkP_X and ClkN_X (FIG. 3) may be matched to maintain the required final CCLK rise/fall slew rates & duty cycle. The local generation of ClkP_X and ClkN_X has the dual benefit of saving power by reducing the number of clock signals to route and distribute. The crowbar current in the final drivers is a significant source of power dissipation and the skew between turn-on and turn-off substantially reduces this source of power loss.

Figure 5:
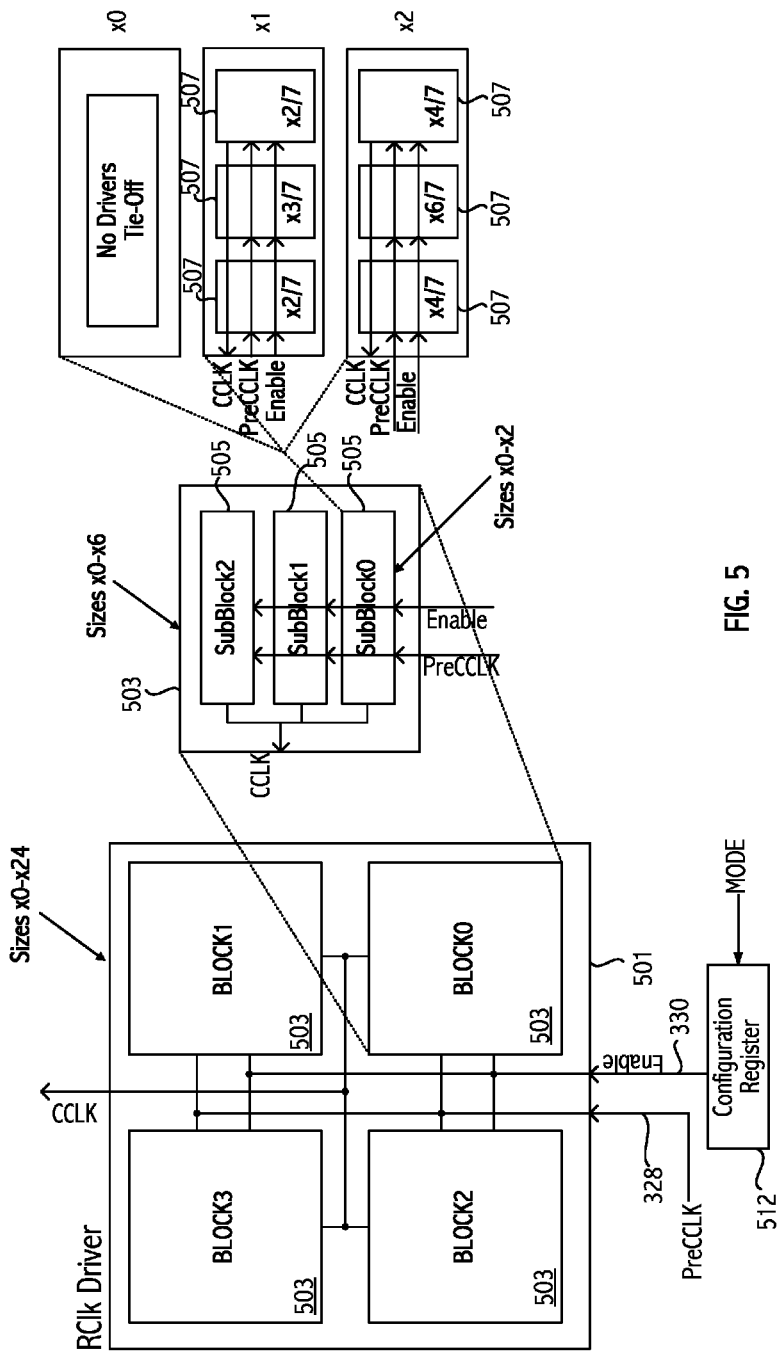
FIG. 5 illustrates an example of a modular clock driver that may be used in embodiments of the clock network.

In an embodiment, the drivers in the clock system are modular. Modular and symmetric design helps automate driver library creation. That substantially simplifies the task of generating a large palette of clock drivers with various drive strength that may be needed in processor or other integrated circuit design. As shown in the embodiment of FIG. 5, each driver 501 is formed of blocks 503. In turn, each of the blocks 503 is formed of sub-blocks 505. In an embodiment, the sub-blocks provide the basic building block of the driver and can have three sizes x0, x1 and x2. Other embodiments may have different sizes and different numbers of blocks and sub-blocks according to the requirements of any particular design or design library. In an embodiment, with three sub-block sizes, three sub-blocks per block, and four blocks, each block 503 can have a drive strength that varies between x0-x6, and each driver can vary between x0-x24. Each of the x/7 elements 507 inside the sub-blocks represents, e.g., a weighted version of the driver 318 in FIG. 3. Thus, an x1 sub-block has a drive strength of 7/7, an x0 sub-block has a drive strength of 0/7, and a x2 sub-block has a drive strength of 14/7. The input clock signal on node 328 is supplied to each block. The illustrated embodiment of FIG. 5 supports variable driver strength by gating off sections of the clock driver 501 using the enable signals supplied on 330, thereby reducing the switching capacitance inside the clock driver and improving efficiency at the expense of lower clock driver strength. The enable signals may be supplied from a configuration register 512 that selects the configuration (value of the enable signals) based on the operational mode of the clock network (e.g., resonant or non-resonant mode). Thus, in an embodiment the size of the sub-block elements 507 is static but the elements can be individually enabled/disabled at runtime to modulate the drive strength of sub-block 505 and thus block 503. Variations on which portions of the block 503 are runtime programmable can made depending on the requirements of a particular system.

Figure 6:
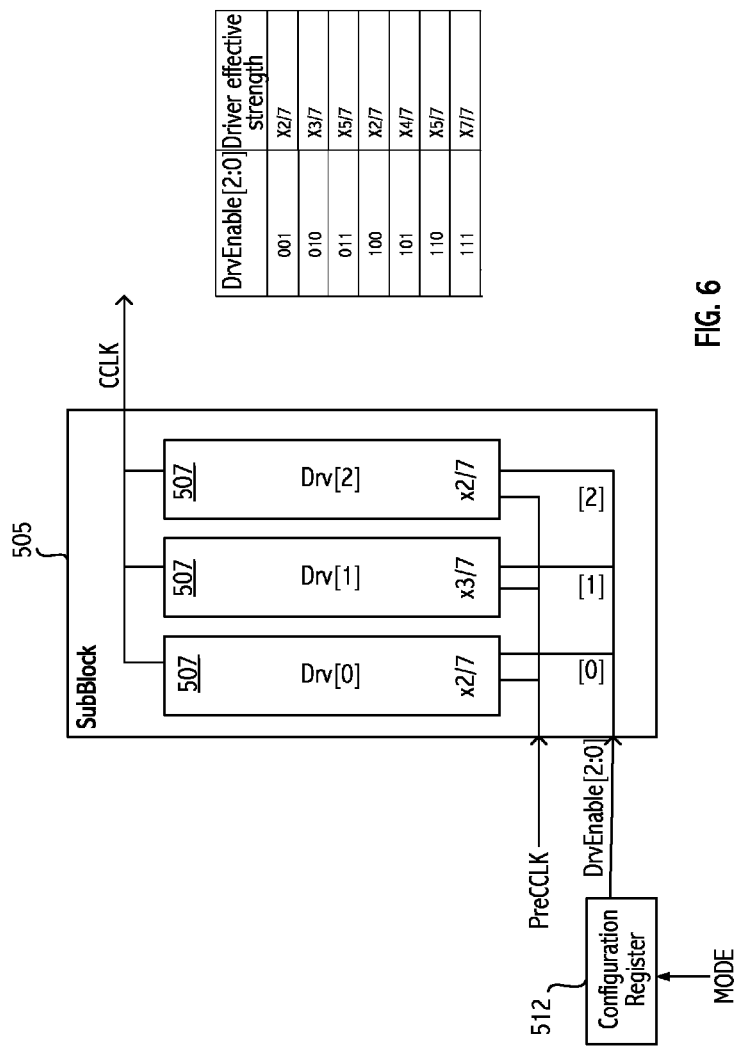
FIG. 6 illustrates control of individual driver sub-blocks with enable signals.

FIG. 6 illustrates how an individual sub-block may be dynamically controlled with enable signals. The enable signals may be controlled from a configuration register that supplies appropriate enables based on the mode (e.g., resonant or non-resonant mode) of the integrated circuit. In the embodiment of FIG. 6, with three enable signals and three weighted drivers 601, 602, and 603. The table in FIG. 6 provides the effective drive strength of the sub-block 505 based on the enable signals, which varies from 2/7 to 7/7. The enable signals in the example of FIG. 6 are supplied from the configuration register 512. The mode in which the clock network is operating may be used to select the values of the enable signals. Providing programmable clock drivers allows runtime-drive control that enables efficiencies in the clock system by reducing the power dissipated in the clock drivers as a result of the drive reduction when the drive strength is not needed. Having weighted drivers in the sub-block results in a reduced number of enable bit transmission saving area and power.

The various embodiments described herein, while well suited to such devices as microprocessors and graphics processors, are also useful to integrated circuits in general, where clock power saving is desirable.

While programmable clock drivers have advantages as described above, there can be considerable cost in run-time configuration of the clock drivers. Consider a clock design with n drivers, each with k drive-modes. In the extreme case, the configuration register can contain a unique configuration for every clock driver in the design allowing for a total of $k^n$ different drive modes. Supporting unique drive configurations for each drive mode for each driver can result in excessive configuration bits and consume routing resources over the core. Furthermore, many of these modes are degenerate, and will not result in different performance or power outcomes for the resulting system. The power efficiency of the final driver for most driver configurations with acceptable clock skew is mainly determined by the effective gain of the final drivers driving the entire clock grid. In an embodiment, a simple configuration approach is employed in which the drivers, which are matched to their particular load, are controlled commonly. For example, the common control reduces (or increases) all the drivers by the same factor, e.g., with respect to the maximum drive capability or each driver, so that they are all weaker (or stronger), but continue to be balanced.

While applying a uniform increase or decrease across drivers is a straightforward alternative, achieving the desired granularity in programming is difficult, and supporting more configuration modes invariably makes the driver itself less energy efficient. An alternative (intermediate) programming methodology is to use a configuration to apply to a set of m drivers, so that the number of configuration bits required is (n/m)k, while the number of possible drive states is $k^{n/m}$.

Figure 7:
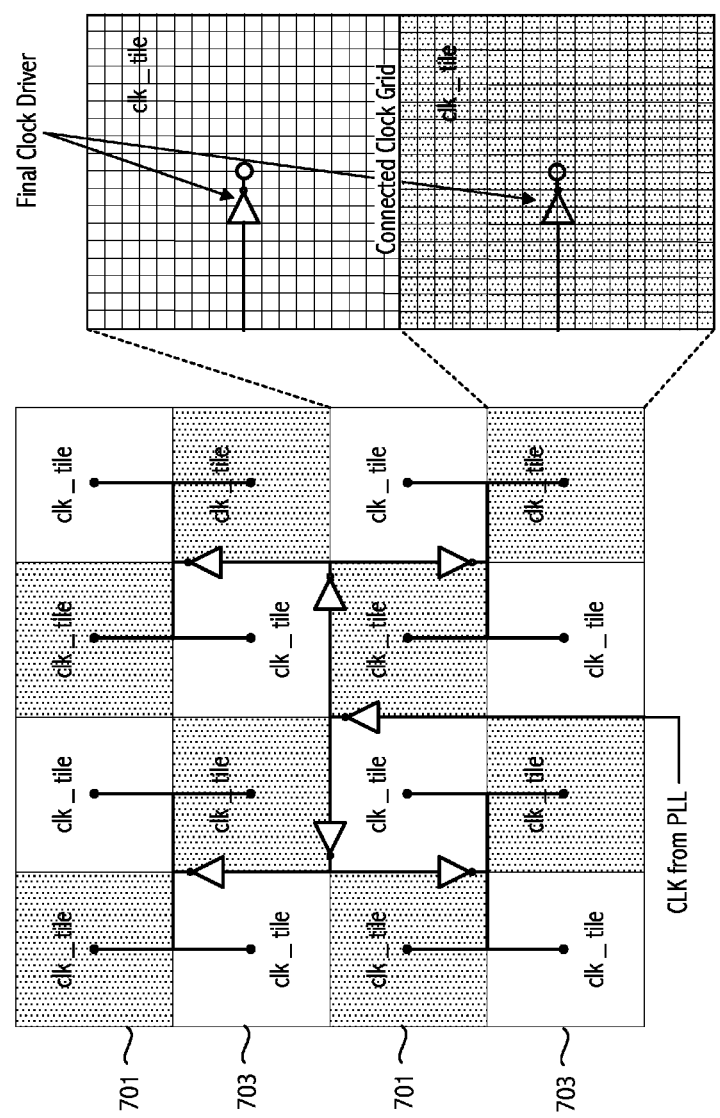
FIG. 7 illustrates a checkerboard pattern for a clock driver configuration.

One particularly effective implementation involves the use of a "checkerboard" programming map. Referring to FIG. 7, the dotted tiles, e.g., tiles 701 in the checkerboard are all mapped to a first common configuration. The plain tiles, e.g., tiles 703, are all mapped to a second common configuration. Assuming there are k possible configurations, the checkerboard approach of FIG. 7 allows for $k^2$ possible configurations of the clock grid, where the configuration refers to the number of drive strength setting that are possible. However, skew implications render many of those configurations unusable since the driver strengths are each based on the load that they are supposed to drive, and varying their drive strengths arbitrarily results in increased skew. A particularly useful strategy is to (without loss of generality) set the drivers in the dotted tiles to a drive setting of d where d:0≤d<k, while setting the drivers in the plain tiles to d+1.

Figure 8:
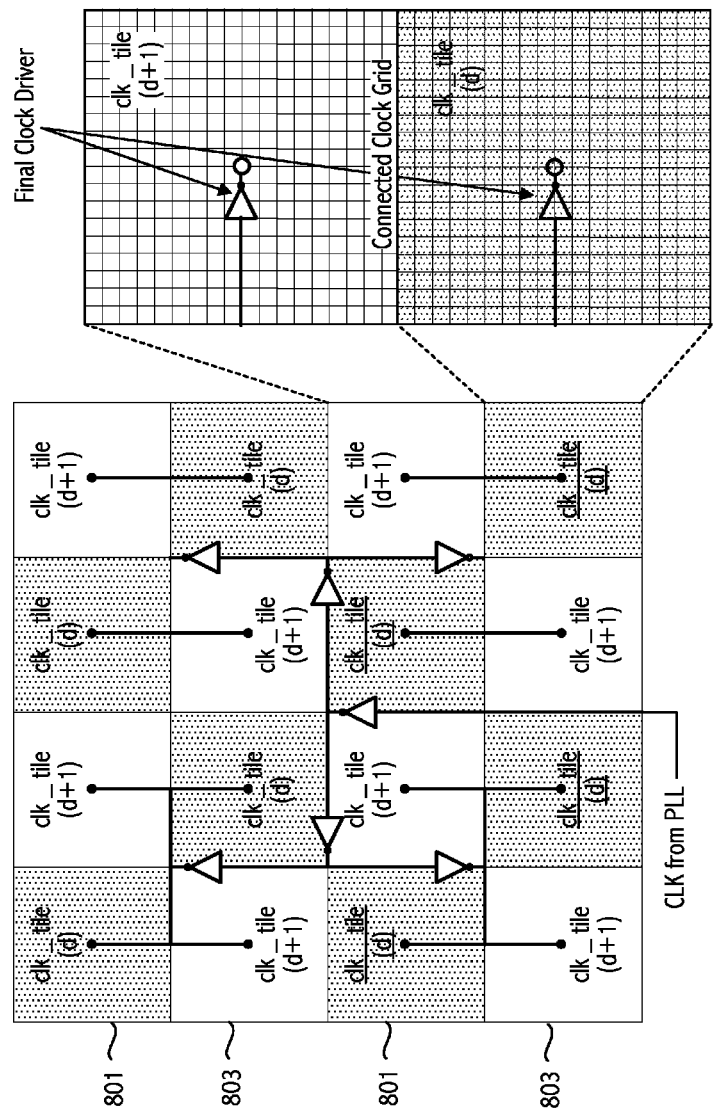
FIG. 8 illustrates another embodiment of a checkerboard pattern for a clock driver configuration.

Remember the drivers are tuned statically to their particular load. For example, referring to FIG. 5 the configured drive strength of elements 507 may be static but those elements may be dynamically enabled. That is the full drive capability of the driver is tuned to its load and varies among drivers. Setting a driver to a drive setting d, means that it is d/k as strong as when it is at full drive. That is, a drive setting of "d" modulates the driver strength to d/k of its full drive strength. So a common setting d makes all such drivers d/k strong as they are in full drive mode. In an absolute sense, these drivers are of different drive strengths as their full drive capability is tuned to their load. At the grid level, this results in an effective drive strength of (2d+1)/2 with minimal impact on the clock skew. FIG. 8 illustrates such an embodiment where tiles 801 are set to a drive strength of d and tiles 803 are set to a drive strength of d+1. When switching between a lower power mode (e.g., resonant mode) and a higher power mode (e.g., non-resonant mode) the value of d varies.

Various of the embodiments herein offer an advantage over existing implementations by avoiding the need for drive strength margin that is applied to the clock design at design time, and replacing it instead with a runtime control of the drive strength so that it may be altered based on the needs of the system in a given configuration. The described embodiments allow a more fine-grained core-wide drive strength configuration can be achieved without significant skew overhead through the judicious selection of driver configurability and driver configuration assignment strategy.

While circuits and physical structures have been generally presumed in describing embodiments of the invention, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photomask generation used to manufacture the integrated circuits. Other data structures, containing functionally descriptive aspects of embodiments described herein, may be used for one or more steps of the manufacturing process.

Computer-readable media include tangible computer readable media, e.g., a disk, tape, or other magnetic, optical, or electronic storage medium. In addition to computer-readable medium having encodings thereon of circuits, systems, and methods, the computer readable media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

The description of the invention set forth herein is illustrative, and is not intended to limit the scope of the invention as set forth in the following claims. For example, embodiments of the invention are not limited in scope to microprocessors or graphics processors. Rather, the solution described herein applies to integrated circuits in general, wherever clock drivers are utilized and variable drive strengths are advantageous. Other variations and modifications of the embodiments disclosed herein may be made based on the description set forth herein, without departing from the scope of the invention as set forth in the following claims.

What is claimed is:

1. A method comprising:
   operating a clock driver circuit to supply a clock signal with a drive strength determined according to one or more control signals supplied to the clock driver that vary during run-time; and
   operating the clock driver circuit with a first drive strength in a non-resonant mode of an associated clock network and with a second drive strength in a resonant mode of the associated clock network, the first drive strength being higher than the second drive strength.

2. The method as recited in claim 1 further comprising determining the drive strength by selectively enabling control signals at gates of transistors.

3. The method as recited in claim 1 further comprising:
   operating the clock network, which is divided into tiles, with a first common configuration for a first subset of tiles and operating the clock network with a second common configuration for a second subset of the tiles.

4. The method as recited in claim 3 wherein there are k possible configurations for drivers in each subset of tiles, k being an integer greater than 1.

5. The method as recited in claim 3 wherein the tiles with the first common configuration and the tiles with the second common configuration form a checkerboard pattern.

6. The method as recited in claim 3 further comprising:
   operating the clock network, with the first subset of tiles having a drive setting for drivers in the first subset to d where 0≤d<k, where k is a number of driver configuration modes, and operating the second subset set of tiles with a drive configuration of d+1, where a drive configuration of d+1 provides a higher drive strength than a drive configuration of d, where a drive setting of "d" modulates driver strength of a driver receiving the drive setting to d/k of its full drive strength.

7. The method as recited in claim 3 further comprising operating the clock grid with an effective drive strength of (2d+1)/2, where 0≤d<k, and where k is an integer greater than 1, indicating a number of driver configuration modes.

8. The method as recited in claim 1 operating the clock driver with a faster turn on time and a slower turn off time for transistors respectively supplying high and low values for the clock signal.

9. A clock driver circuit comprising:
   a plurality of clock driver segments coupled to receive an input clock signal and supply a segment clock signal output to an output node of the clock driver circuit, wherein a drive strength of an output clock signal on the output node of the clock driver circuit is based on a drive strength of each of the segment clock signals;
   wherein one or more of the clock driver segments is responsive to one or more of the control signals to vary a segment drive strength based on the one or more control signals and therefore vary the drive strength of the output clock signal.

10. A clock driver circuit comprising:
    a plurality of blocks coupled to supply a clock signal to an output node;
    a plurality of sub-blocks forming each of the blocks; and
    at least one of the sub blocks having a different drive strength than another of the sub blocks;
    wherein each sub-block has one of n sizes, n being an integer, each size corresponding to a particular drive strength.

11. The apparatus as recited in claim 10 wherein each sub-block receives a separate control signal to enable a respective sub-block.

12. The apparatus as recited in claim 10 wherein n is 3.

13. An apparatus comprising:
    a clock driver circuit of a clock network, the clock driver circuit coupled to receive an input clock signal and to supply an output clock signal with a drive strength determined according to one or more control signals supplied to the clock driver circuit that vary during run-time; and wherein the clock driver circuit is operable to provide the output clock signal with a first drive strength in a non-resonant mode of operation of the clock network and with a second drive strength in a resonant mode of operation of the clock network, the first drive strength being higher than the second drive strength, the one or more control signals varying according to whether the clock network is operating in the resonant mode or the non-resonant mode.

14. The apparatus as recited in claim 13 further comprising a configuration register that supplies the one or more control signals according to the mode of operation.

15. An apparatus comprising:
a clock network including a plurality of clock drivers, the clock network being divided into tiles, the clock network having a first common driver configuration for a first subset of tiles and a second common driver configuration for a second subset of the tiles;
the first subset of tiles have a drive strength setting of d for drivers in the first subset, where $0 \leq d < k$, where k is a number of driver configuration modes corresponding to different drive strength, and
the second subset of tiles have a drive configuration strength setting of d+1, where a drive configuration of d+1 provides a higher drive strength than a drive configuration of d.

16. The apparatus as recited in claim 15 wherein there are k possible configurations for clock drivers in each subset of tiles, k being an integer greater than 1.

17. The apparatus as recited in claim 15 wherein the tiles with the first common configuration and the tiles with the second common configuration form a checkerboard pattern.

18. The apparatus as recited in claim 15 wherein the clock network has an effective drive strength of $(2d+1)/2$, where $0 \leq d < k$, and where k, an integer greater than 1, indicates a number of driver configuration modes, each driver configuration mode corresponding to a different drive strength.

* * * * *